3,522,353
PROMOTING THE GROWTH OF ANIMALS
WITH HALOACIDS
Gino J. Marco, Webster Groves, Mo., and Eugene S. Erwin, Phoenix, Ariz., assignors to Monsanto Company, St. Louis, Mo., a corporation of Delaware
No Drawing. Filed June 26, 1967, Ser. No. 648,994
Int. Cl. A61k 27/00
U.S. Cl. 424—317        12 Claims

ABSTRACT OF THE DISCLOSURE

Animal feed composition containing at least one growth promoting compound of the formula

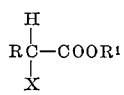

wherein X is halogen (Cl, Br, and I), R is selected from the group consisting of hydrogen and alkyl of not more than 20 carbon atoms and $R^1$ is selected from the group consisting of hydrogen and alkyl of not more than 4 carbon atoms.

---

This invention relates to animal feed compositions and to methods of improving growth response in animals.

In accordance with the present invention, it has now been found that certain haloacids and haloacetates are useful growth promoters for animals. Animal diets containing the haloacids and haloacetates elicit a substantially greater weight gain and feed efficiency response in animals than when said diets are used alone. The growth promoting compounds are also useful for the improvement of carcass quality in cattle as manifested by increased marbling.

The improved weight gain and feed efficiency response in animals is accomplished in accordance with this invention by a method which comprises orally administering to the animal a growth-promoting amount of at least one compound of the formula

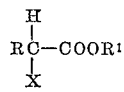

wherein X is halogen (Cl, Br, and I), R is selected from the group consisting of hydrogen and alkyl of not more than 20 carbon atoms and $R^1$ is selected from the group consisting of hydrogen and alkyl of not more than 4 carbon atoms.

The compounds of the above formula are useful in animal feeds generally, for example, poultry, swine and ruminant feeds, but they are particularly advantageous when employed in ruminant feeds for cattle and sheep.

In the above formula R can be hydrogen and alkyl such as methyl, ethyl, n-propyl, isopropyl, n-butyl, sec-butyl, iso-butyl, tert-butyl, amyl, hexyl, heptyl, octyl, nonyl, decyl, undecyl, dodecyl, octadecyl and the various homologues and isomers of alkyl of not more than 20 carbon atoms. $R^1$ can be hydrogen and the alkyl of not more than 4 carbon atoms listed above for R.

For the sake of brevity, the term "active ingredient" will be used hereinafter to describe the haloacids and haloacetates useful in this invention.

The value of animal feeds generally has been determined directly by feeding the animal. Within the past few years, however, the in vitro rumen technique whereby the changes occurring in feeds brought about by microorganisms are measured more readily and with great accuracy has been employed more frequently in the evaluation of animal feeds. This technique involves the use of an apparatus in which the digestive process of the animals are conducted and studied in vitro. The animal feeds, rumen inoculum and various growth promotants are introduced into and withdrawn from a laboratory unit under carefully controlled conditions and the changes taking place are studied critically and progressively during the consumption of the feed by the microorganisms. The results obtained by use of the aforesaid transplanted rumen technique have been confirmed in vivo by actual feeding of animals.

Several parameters have been employed in the in vitro test methods to determine the effectiveness of the active growth promoting material. In the following examples the parameter employed in evaluating the active ingredients is the change in propionic acid content in the rumen fluids. An increase in the propionic acid content of the rumen fluid indicates that a desirable response in overall ruminant performance has been brought about by the active ingredients in the feed compositions. These in vitro observations have been confirmed by long-term in vivo feeding of ruminants over several weeks in which weight gain and feed efficiency are measured.

In the examples of the present invention which follow, evaluation of the active ingredients is made (1) in vitro and (2) in vivo. The in vitro rumen fluids are analyzed by a gas chromatographic procedure to determine the change of propionic acid content therein. The change in propionic acid content is expressed as percent of the propionic acid content found in the control rumen fluid. In other examples long-term in vivo feeding studies are used to show a reliable correlation between propionic acid increase in the rumen fluid and improved animal performance.

The following examples, in which parts and percent are expressed by weight unless otherwise indicated, further illustrate the advantages of this invention.

EXAMPLE 1

The in vitro experiments are fermentation reactions in which the conditions existing in the rumen are simulated. The active ingredient (534 mg.) is dissolved in 5 to 10 ml. of acetone or methylene chloride and mixed with 2 grams of a standard substrate (68% corn starch, 17% alphacellulose, and 15% soybean meal). The mixture is evaporated in a nitrogen atmosphere with constant stirring to provide a substrate coated with the active ingredient. This coated substrate (119 mg.) is mixed with 300 mg. of uncoated substrate and charged to 50 ml. Erlenmeyer flasks. Rumen fluid from a fasted sheep (16 to 20 hours) is taken, filtered through four layers of cheesecloth and 10 ml. of the fluid charged to each flask. A buffer solution of the following composition is prepared and adjusted to pH 6.8 with aqueous 4 N HCl.

| | Buffer solution in grams per liter |
|---|---|
| $NaH_2PO_4$ | .316 |
| $KH_2PO_4$ | .152 |
| $NaHCO_3$ | 2.260 |
| $KCl$ | .375 |
| $NaCl$ | .375 |
| $MgSO_4$ | .112 |
| $CaCl_2$ | .038 |
| $FeSO_4 \cdot 7H_2O$ | .008 |
| $MnSO_4$ | .004 |
| $ZnSO_4 \cdot 7H_2O$ | .004 |
| $CuSO_4 \cdot 5H_2O$ | .002 |
| $CoCl_2$ | .001 |

Ten milliliters of the buffer solution are added to each flask. The flasks are purged with nitrogen, stoppered with pressure release valves and heated at 39° C. ±0.5° C. on a water shaker bath. The fermentation mixtures are incubated for 16 hours and then analyzed to determine the propionate response. Results are given below in Table I.

TABLE I

| Compound: | Propionate response, percent of control |
|---|---|
| Control | 100 |
| Chloroacetic acid | 121 |
| Bromoacetic acid | 137 |
| Iodoacetic acid | 139 |
| 2-bromopropionic acid | 126 |
| 2-bromolauric acid | 178 |
| 2-bromobutyric acid | 147 |
| 2-bromocaproic acid | 120 |
| Methylmonochloroacetate | 132 |
| Ethylmonchloroacetate | 130 |
| 2-bromoundecanoic acid | 182 |
| 2-bromostearic acid | 183 |

A basal ration having approximately the following composition was used in Example 2.

| Component: | |
|---|---|
| Ground corn | percent 27.45 |
| Soybean meal (50%) | do 18.90 |
| Defluorinated phosphate (18% P) | do 0.81 |
| Iodized salt | do 0.45 |
| Trace minerals | do 0.09 |
| Ground corn cobs | do 10.00 |
| Molasses | do 8.10 |
| Chopped alfalfa hay | do 34.20 |
| Vitmain A 10 MIU/gm. | gms./ton 275 |

EXAMPLE 2

Two groups of sheep were provided the above basal ration for 42 days, self-fed. The ration for one group contained 0.0005% of bromoacetic acid. The ration for the other group contained no active ingredient additive and served as control. The average weight gain and feed efficiency for each group are set forth in Table II.

TABLE II

| Compound: | Average gain, kg. | Feed efficiency |
|---|---|---|
| Control | 5.3 | 9.14 |
| Bromoacetic acid | 6.6 | 7.90 |

The active ingredients useful in this invention are incorporated in animal feed compositions in an effective amount over a wide range of concentrations. Significant animal responses are obtained with feed compositions containing from about 0.0001% by weight to about 0.1% by weight of active ingredient. Preferably, the feed compositions contain from about 0.0005% by weight to about 0.05% by weight of active ingredient.

Based on a fattening lamb consuming about 3 pounds of ration per day and cattle each consuming about 20 pounds of ration per day, the active ingredients are administered to sheep in an amount from about 0.0013 gm. to about 1.3 gm. per head per day, and to cattle in an amount from about 0.009 gm. to about 9.0 gm. per head per day. The active ingredients are preferably administered to sheep in an amount from about 0.007 gm. to about 0.7 gm. per head per day and to cattle in an amount from about 0.045 to about 4.5 gm. per head per day. However, the preferred amount will vary to some extent depending upon the age, weight and environment of the particular species of animal being fed.

The oral administration of active ingredients in accordance with this invention can be accomplished in the form of tablets, capsules, powders, solutions, suspensions or in admixture with one or more components of the animal's diet. Alternatively, the active ingredients can be administered in an equivalent amount in the animal's drinking water.

Conventional ruminant feed rations generally comprise at least about 2 percent plant ingredients such as hay, straw, silage, yellow corn, pasturage, ground corn cobs, cottonseed hulls, cotton mill wastes, beet pulp, corn meal, soybean meal, wheat bran, wheat middlings, dehydrated alfalfa, ground oats, millet, linseed meal, coconut meal, distillers, dried grains, peanut meal, cottonseed meal and the like plant products. Most ruminant feed rations also contain up to about 2 percent mineral ingredients such as bone meal, limestone, salt (NaCl) and the various trace minerals including salts of zinc, copper, manganese, cobalt, iodine, iron and the like. Other materials which can be incorporated into ruminant feed rations in varying amounts include animal ingredients such as fish meal, meat and bone scraps, dried milk, animal fats, dried whey solubles and the like; vitaminaceous ingredients such as vitamins A, $B_{12}$, D and K, as well as the B vitamins such as riboflavin, niacin, pantothenic acid or salts thereof, choline, pyridoxine, thiamine, nicotinic acid or salts thereof, biotin, folic acid and the like; amino acids such as methionine, phenylalanine, arginine, glycine, histidine, isoleucine, leucine, lysine, threonine, tryptophan, valine and the like; medicaments such as antibiotics, steroids, arsenicals, anthelmintics and the like, and antioxidants, for example, 6-ethoxy-2,2,4-trimethyl-1,2,-dihydroquinoline, butylated hydroxy anisol, butylated hydroxy toluene, 4,4-bis(2,6-di-t-butyl phenol), gamma-tocopherol, esters of gallic acid, and the like.

The feed compositions of this invention can be prepared by incorporating the active ingredients in various ways into any or all components of conventional diets for the type of animal in question. The active ingredients can be added to the diet rations as the pure compounds, as a stabilized concentrate wherein the active ingredient is coated with a protective material such as gelatine or gelatine and sugar, as an adsorbate on silica gel, oatmeal, soybean meal, ion-exchange resins, as a simple admixture with a diluent such as cereal meal, and oil meal and stabilizers, or in solution or emulsion in a vegetable oil such as peanut oil, soybean oil, sesame oil and the like and preferably including a stabilizer. An oil solution or emulsion lends itself to spraying on the basal ration. Alternatively, the active ingredients can be mixed with other feed additives such as vitamins, antibiotics, minerals and other materials of this nature in a feed supplement which is supplied to grain mills or to feed manufacturers who then incorporate it into the finished diet to be supplied to the animals by the farmer. Blending of such materials can be accomplished in the usual type apparatus used for the preparation of dry feed products. For young animals the active ingredients can be incorporated into liquid or semi-liquid feeds or mashes in the form of a suspension or dispersion of the active material. An emulsion or dispersion in peanut oil, soybean oil, and the like can be prepared and these are particularly adapted for liquid compositions including drinking water. The active ingredients can be administered alone to the animals but it is more convenient and effective to use the active material in the animals' feed composition.

The embodiments of the invention in which an exclusive property or privilege is claimed are defined as follows:

1. A method for improving growth promoting response in an animal selected from the group consisting of swine, poultry and ruminants which comprises orally administering to said animal a growth promoting amount of a compound of the formula

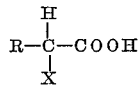

wherein X is a halogen, and R is selected from the group consisting of hydrogen and alkyl of not more than 20 carbon atoms.

2. Method of claim 1 wherein the animal is a ruminant.

3. A method for improving growth promoting response in an animal selected from the group consisting of swine, poultry and ruminants which comprises feeding to said animal a composition comprising an animal feed component and a growth-promoting amount of a compound of the formula

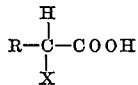

wherein X is halogen, and R is selected from the group consisting of hydrogen and alkyl of not more than 20 carbon atoms.

4. Method of claim 3 wherein the animal is a ruminant.

5. Method of claim 1 wherein R is hydrogen.

6. Method of claim 1 wherein X is bromine.

7. Method of claim 1 wherein R is alkyl and X is chlorine.

8. Method of claim 1 wherein the compound is bromoacetic acid.

9. Method of claim 1 wherein the compound is chloroacetic acid.

10. Method of claim 1 wherein the compound is 2-bromoundecanoic acid.

11. Method of claim 1 wherein the compound is 2-bromolauric acid.

12. A composition for improving growth promoting response in an animal selected from the group consisting of swine, poultry and ruminants which comprises an animal feed component and a growth promoting amount of a compound of the formula

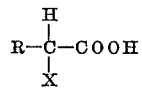

wherein X is halogen, and R is selected from the group consisting of hydrogen and alkyl of not more than 20 carbon atoms.

References Cited

UNITED STATES PATENTS 1,589,866  6/1926  Siegler _____ 424—318

OTHER REFERENCES

Chem. Abst. (I) 64, p. 2649a (1966).

ALBERT T. MEYERS, Primary Examiner

S. J. FRIEDMAN, Assistant Examiner

U.S. Cl. X.R.

99—2; 424—311, 312, 318